(12) United States Patent
Kondziela

(10) Patent No.: US 12,446,992 B2
(45) Date of Patent: Oct. 21, 2025

(54) DYNAMIC MIXER FOR USER-FRIENDLY INSERTION INTO A MIXING APPARATUS

(71) Applicant: Kulzer GmbH, Hanau (DE)

(72) Inventor: Mike Kondziela, Weilburg (DE)

(73) Assignee: Kulzer GmbH, Hanau (DE)

( * ) Notice: Subject to any disclaimer, the term of this patent is extended or adjusted under 35 U.S.C. 154(b) by 896 days.

(21) Appl. No.: 17/627,637

(22) PCT Filed: Jul. 10, 2020

(86) PCT No.: PCT/EP2020/069647
§ 371 (c)(1),
(2) Date: Jan. 14, 2022

(87) PCT Pub. No.: WO2021/009073
PCT Pub. Date: Jan. 21, 2021

(65) Prior Publication Data
US 2022/0257339 A1    Aug. 18, 2022

(30) Foreign Application Priority Data

Jul. 15, 2019   (DE) .......................... 102019119161.0

(51) Int. Cl.
| | |
|---|---|
| A61C 5/00 | (2017.01) |
| A61C 5/68 | (2017.01) |
| B01F 27/09 | (2022.01) |
| B01F 27/213 | (2022.01) |
| B01F 33/501 | (2022.01) |
| B01F 35/71 | (2022.01) |
| H02K 5/04 | (2006.01) |

(Continued)

(52) U.S. Cl.
CPC .............. *A61C 5/68* (2017.02); *B01F 27/092* (2022.01); *B01F 27/213* (2022.01); *B01F 33/5014* (2022.01); *B01F 35/7164* (2022.01); *H02K 5/04* (2013.01); *H02K 7/003* (2013.01); *B01F 2101/19* (2022.01)

(58) Field of Classification Search
CPC .............. B01F 35/7164; B01F 33/5014; B01F 2101/19
See application file for complete search history.

(56) References Cited

U.S. PATENT DOCUMENTS

| | | | |
|---|---|---|---|
| 6,244,740 B1 | 6/2001 | Wagner et al. | |
| 8,579,497 B2 | 11/2013 | Harre et al. | |

(Continued)

FOREIGN PATENT DOCUMENTS

| | | |
|---|---|---|
| DE | 486223 C | 12/1929 |
| DE | 41 27 661 A1 | 2/1993 |

(Continued)

*Primary Examiner* — Anshu Bhatia
(74) *Attorney, Agent, or Firm* — Norris McLaughlin, PA

(57) ABSTRACT

The invention relates to a method (100) for congruent alignment of a first polygonal multi-edge geometry (2) of a rotor shaft (3) of a dynamic mixer (4) with a second polygonal multi-edge geometry (5) of a drive shaft (6) of a motor (7) of a mixing apparatus (8), and optionally insertion of the second polygonal multi-edge geometry (5) of the drive shaft (6) of the motor (7) of the mixing apparatus (8) into or onto the first polygonal multi-edge geometry (2) of the rotor shaft (3) of the dynamic mixer (4), as well as a dynamic mixer for use in the method as also use of the mixer in the method.

13 Claims, 6 Drawing Sheets

(51) Int. Cl.
    *H02K 7/00*         (2006.01)
    *B01F 101/19*     (2022.01)

(56) References Cited

U.S. PATENT DOCUMENTS

| | | | |
|---|---|---|---|
| 2009/0207685 A1* | 8/2009 | Busin | B01F 33/822 |
| | | | 366/15 |
| 2009/0279382 A1 | 11/2009 | Harre et al. | |
| 2011/0056985 A1* | 3/2011 | Bublewitz | A61C 5/64 |
| | | | 222/137 |
| 2012/0097702 A1* | 4/2012 | Harre | A61C 5/64 |
| | | | 222/145.6 |
| 2012/0218856 A1 | 8/2012 | Walter et al. | |
| 2013/0265846 A1 | 10/2013 | Bublewitz et al. | |
| 2013/0329517 A1 | 12/2013 | Linne et al. | |
| 2017/0239683 A1 | 8/2017 | Schultheiss et al. | |
| 2020/0254404 A1 | 8/2020 | Bicker | |

FOREIGN PATENT DOCUMENTS

| | | |
|---|---|---|
| DE | 298 18 499 U1 | 3/2000 |
| DE | 100 43 489 A1 | 3/2002 |
| EP | 1 836 992 A1 | 9/2007 |
| EP | 3 450 003 A1 | 3/2019 |
| WO | 2011/031440 A1 | 3/2011 |
| WO | 2012/055926 A1 | 5/2012 |
| WO | 2012/116863 A1 | 9/2012 |

\* cited by examiner

DYNAMIC MIXER FOR USER-FRIENDLY INSERTION INTO A MIXING APPARATUS

This application is a 371 of International Patent Application No. PCT/EP2020/069647, filed Jul. 10, 2020, which claims priority of German Patent Application No. 10 2019 119 161.0, filed Jul. 15, 2019, the entire contents of which patent applications are hereby incorporated herein by reference.

The invention relates to a method for congruent alignment and optional congruent guiding of a first polygonal multi-edge geometry of a rotor shaft of a dynamic mixer, in particular of a dental dynamic mixer, and a second polygonal multi-edge geometry of a drive shaft of a motor of a mixing apparatus, in particular to avoid idle rotations of the rotor shaft as also of the drive shaft and/or to avoid torque loss when transmitting torques of the drive shaft of the motor to the rotor shaft of the dynamic mixer in particular during a mixing process of the dynamic mixer, as well as a mixing apparatus and mixer to avoid them. The invention further relates to an orientation template for congruent alignment of a first polygonal multi-edge geometry of a rotor shaft of a dynamic mixer with a second polygonal multi-edge geometry of a drive shaft of a motor of a mixing apparatus. In addition, the invention relates to a mixing apparatus comprising a motor having a drive shaft, a cartridge having at least two cartridge bodies to receive at least two dental materials, and a dynamic mixer with rotor and rotor shaft, the drive shaft being adapted to drive the rotor shaft.

In dental field, impression materials consist of at least two pasty compositions. Said two components are filled into cartridges and pressed out immediately before use and mixed at the same time. So-called dynamic mixers are used for large-volume cartridges. Said dynamic mixers have two inlet nozzles that are connected (put on) to the outlet openings of the double cartridge. The dynamic mixer comprises a rotor that is driven by a drive shaft of the mixing device. A hexagonal geometry has proven for torque transmission as interface between drive shaft and rotor shaft of the dynamic mixer. It has established itself as a standard across manufacturers.

Inserting/installing the dynamic mixer into the mixing device is rather awkward and relatively laborious. First, the dynamic mixer is put on the cartridge. In doing so, the two outlet ducts of the double cartridge are respectively connected with the tow inlet nozzles of the dynamic mixer. Space conditions are very confined since the double cartridge is already inserted into the mixing device. Subsequently, for example, the outer hexagon on the drive shaft of the mixing device is inserted into the inner hexagon of the rotor shaft of the dynamic mixer. The drive shaft of the mixing device is covered by the dynamic mixer and the cartridge and is therefore difficult to reach and see. Connection of the drive shaft and rotor shaft is made even more difficult as the two hexagonal geometries may be positioned rotationally symmetrical to each other in any way. The user has to turn one of the two shafts to make the hexagonal geometries exactly opposite each other. Not until then, the drive shaft of the mixing device may be driven forward and the connection is made. The process takes time from the user and, in the worst case, has to be repeated several times. However, this has been the usual standard process up to now.

It is an object of the present invention to provide a method no longer showing the problems described in the state of the art. In particular, the time period of adjustment between motor shaft of the mixing apparatus and rotor shaft of the dynamic mixer shall be reduced and simplified. In particular, the time period of dynamic mixing for dispensing dental impression materials, preferably polydimethyl silicone-based impression materials, shall be reduced and simplified.

The object of the present invention is solved by a method for congruent alignment and optionally coaxial alignment of a first polygonal multi-edge geometry of a rotor shaft of a dynamic mixer, in particular for congruent or coaxial guiding of a of a first polygonal multi-edge geometry of a rotor shaft of a dynamic mixer, in particular of a dental dynamic mixer, with a second polygonal multi-edge geometry of a drive shaft of a motor of a mixing apparatus, in particular dental mixing apparatus, and optionally insertion of the second polygonal multi-edge geometry of the drive shaft of the motor of the mixing apparatus into or onto the first polygonal multi-edge geometry of the rotor shaft of the dynamic mixer, the method comprising a step selected from:

a) providing a dynamic mixer the first polygonal multi-edge geometry of which of the rotor shaft being in a first defined rotational position, and positioning the dynamic mixer in the mixing apparatus, the second polygonal multi-edge geometry of the drive shaft of the motor of the mixing apparatus being in the second defined rotational position or being transferred from a second starting rotation position into a second defined rotational position, or b) transferring the first polygonal multi-edge geometry of the rotor shaft of the dynamic mixer being positioned in the mixing apparatus from a first starting rotational position in a first defined rotational position, and/or c) transferring the second polygonal multi-edge geometry of the drive shaft of the motor of the mixing apparatus from a second starting rotational position in a second defined rotational position;

wherein, after positioning a) the dynamic mixer in the mixing apparatus, the first defined rotational position is congruently aligned with the second rotational position, or wherein, after positioning the dynamic mixer in the mixing apparatus and performing one of the two steps b) or c) or both steps b) and c), the first defined rotational position is congruently aligned with the second rotational position, wherein b) transferring the first polygonal multi-edge geometry of the rotor shaft of the dynamic mixer from the first starting rotational position into the first defined rotational position is carried out manually or automatically, wherein i) an orientation template having a third polygonal multi-edge geometry is used when manually transferring the first polygonal multi-edge geometry of the rotor shaft of the dynamic mixer, and ii) means for optical marking arranged at the first polygonal multi-edge geometry of the rotor shaft of the dynamic mixer are recognized by an optical sensor of the mixing apparatus to identify a respective rotational position of the first polygonal multi-edge geometry of the rotor shaft of the dynamic mixer when automatically transferring the first polygonal multi-edge geometry of the rotor shaft of the dynamic mixer from the first starting rotational position in the first defined rotational position, wherein congruent alignment of the first defined rotational position of the rotor shaft of the dynamic mixer with the second defined rotational position of the drive shaft of the motor of the mixing apparatus of step b) comprises:

sliding the second polygonal multi-edge geometry of the drive shaft of the motor of the mixing apparatus into or onto the first polygonal multi-edge geometry of the rotor shaft of the dynamic mixer, the second polygonal multi-edge geometry of the drive shaft of the motor of the mixing apparatus being in a defined rotational position, wherein driving the drive shaft of the motor of the mixing apparatus into the pre-defined rotational position is carried out by a control function of the mixing apparatus, wherein the pre-defined rotational position of the drive shaft of the motor of the mixing apparatus has been fixed, the second polygonal multi-edge geometry of the drive shaft of the motor in the pre-defined rotational position being substantially congruent to the first polygonal multi-edge geometry of the rotor shaft of the dynamic mixer in the defined rotational position, or wherein d) the first polygonal multi-edge geometry of the rotor shaft of the dynamic mixer is in a first starting rotational position, wherein means for optical marking are arranged at the first polygonal multi-edge geometry of the rotor shaft or at the rotor shaft of the dynamic mixer, which are being recognized by an optical sensor of the mixing apparatus, to identify a respective rotational position of the first polygonal multi-edge geometry of the rotor shaft of the dynamic mixer, and transferring the second polygonal multi-edge geometry of the drive shaft of the motor of the mixing apparatus from a second starting rotational position in the aforementioned respective rotational position of the first polygonal multi-edge geometry of the rotor shaft of the dynamic mixer, so that the second polygonal multi-edge geometry of the drive shaft of the motor of the mixing apparatus and the first polygonal multi-edge geometry of the rotor shaft being congruently aligned in the respective rotational position of the multi-edge geometry, wherein the means for optical marking comprise braille, a reflector and/or a 3D code.

The method serves to avoid idle rotations and/or to avoid torque losses when transmitting torques of the drive shaft of the motor to the rotor shaft of the dynamic mixer, in particular when inserting the mixer into the mixing apparatus and/or when connecting drive shaft and rotor shaft and/or during a mixing process of the dynamic mixer.

Preferably, the mixing apparatus, the method and the mixer are a dental mixing apparatus, a method for mixing a dental material and a dental mixer. Preferably, the dental material is an impression material for impression of oral surfaces. Usually, impression materials are pasty. Preferably, the polygonal multi-edge geometry of the rotor shaft of the dynamic mixer is made of a polymeric material, preferably made of a polypropylene, polyethylene, polyoxymethylene, or a mixture comprising one of the polymeric materials, optionally filled with inorganic fillers. Preferably, the drive shaft of the motor is made of a metal, a metal alloy, a polymeric material or a hybrid material. The polygonal multi-edge geometry of the rotor shaft may additionally be provided with a surface having reduced static friction, such as for example with fluorinated organic polymers. Exemplarily, partial to perfluorinated polyethers optionally in a solid lubricant formulation shall be mentioned.

In a more particularly preferable embodiment of the method, the method comprises the steps of a) providing a dynamic mixer the first polygonal multi-edge geometry of which of the rotor shaft being in a first defined rotational position, and positioning the dynamic mixer in the mixing apparatus, in particular the dental mixing apparatus, the second polygonal multi-edge geometry of the drive shaft of the motor of the mixing apparatus being in the second defined rotational position or being transferred from a second starting rotation position into a second defined rotational position, preferably the second polygonal multi-edge geometry of the drive shaft of the motor of the mixing apparatus is in the second defined rotational position, and optionally the second polygonal multi-edge geometry of the drive shaft of the motor of the mixing apparatus is transferred into the defined rotational position prior to each de novo positioning of a further dynamic mixer, in particular after removing a previously positioned dynamic mixer, preferably the transfer is carried out by a control function of the mixing apparatus, in particular of the motor of the mixing apparatus, wherein, in positioning, in particular prior to, during and after the positioning, in a) of the dynamic mixer in the mixing apparatus, the first defined rotational position is congruently aligned with the second rotational position.

Wherein driving and/or transferring the drive shaft of the motor of the mixing apparatus into the first defined rotational position has been carried out by a control function of the mixing apparatus, wherein the first defined rotational position of the drive shaft of the motor of the mixing apparatus has been fixed optionally, the second polygonal multi-edge geometry of the drive shaft of the motor in the first defined rotational position being substantially congruent to the first polygonal multi-edge geometry of the rotor shaft of the dynamic mixer in the defined rotational position.

In this context, it is preferred for the loosening torque of the rotor of the dynamic mixer to be greater than or equal to 12 Ncm, preferably greater than or equal to 13 Ncm, in particular greater than or equal to 14 Ncm, particularly preferred equal to 12 Ncm.

Driving the drive shaft of the motor of the mixing apparatus into the pre-defined rotational position by a control function of the mixing apparatus, wherein the pre-defined rotational position of the drive shaft of the motor of the mixing apparatus is fixed, is not carried out prior the mixing process only, but also after the mixing process. When the control function bringing the drive shaft to a stop in the pre-defined rotational position after finishing the mixing process, the driving process is thus shorted.

In an embodiment, the rotor shaft, in particular the centrical opening, preferably a blind hole, preferably connection geometry, preferably in the form of an inner multi-edge geometry, of the rotor shaft, of the dynamic mixer is the female part and the drive shaft, in particular in the form of an outer multi-edge geometry, of the motor is the male part when congruently and coaxially clicking-in and when congruently and coaxially guiding rotor shaft and drive shaft. The female part encompasses the male part in a positive-locking manner. Preferably, the inner multi-edge and outer multi-edge geometry are formed in a positive-locking manner.

In a further embodiment, the rotor shaft of the dynamic mixer is the male part and the drive shaft of the motor is the female part when congruently and coaxially clicking-in and when congruently and coaxially guiding rotor shaft and drive shaft.

In an embodiment, the rotor shaft of the dynamic mixer has a first section to guide the drive shaft of the motor and a second section to receive torques of the drive shaft, in case of the rotor shaft of the dynamic mixer being the female part when congruently and coaxially clicking-in and/or when congruently and coaxially guiding rotor shaft and drive shaft.

In a further embodiment, the drive shaft of the motor has a third section to guide the rotor shaft of the dynamic mixer and a fourth section to transmit torques onto the rotor shaft of the dynamic mixer, in case of the drive shaft of the motor being the female part when congruently and coaxially clicking-in and/or when congruently and coaxially guiding rotor shaft and drive shaft.

In an embodiment, the first polygonal multi-edge geometry, in particular inner multi-edge geometry, of the rotor shaft is part of the first section to guide the drive shaft of the motor. In a further embodiment, the first polygonal multi-edge geometry, in particular inner multi-edge geometry, of the rotor shaft is part of the second section to receive torques of the drive shaft.

In a further embodiment, the second polygonal multi-edge geometry of the drive shaft is part of the third section to guide the rotor shaft of the dynamic mixer. In a further embodiment, the second polygonal multi-edge geometry, in particular outer multi-edge geometry, of the drive shaft is part of the fourth section to transfer torques onto the rotor shaft of the dynamic mixer.

In a further embodiment, the rotor shaft of the dynamic mixer is free from the first section to guide the drive shaft of the motor.

In a further embodiment, the drive shaft of the motor is free from the third section to guide the rotor shaft of the dynamic mixer.

In an embodiment, the rotor shaft of the dynamic mixer and the drive shaft of the motor are free from additional guiding structures and/or guiding sections, the first polygonal multi-edge geometry of the rotor shaft and the second polygonal multi-edge geometry of the drive shaft being sufficient for their common congruent and coaxial alignment prior to commissioning of the dynamic mixer and for their congruent and/or coaxial guiding during the mixing process of the dynamic mixer. Thus, in this embodiment, 100% of the rotating outer surface of the drive shaft of the motor serves for transmitting torques from the drive shaft to the rotor shaft of the dynamic mixer. At the same time, 100% of the outer surface of the rotor shaft, in particular in the form of a connection geometry, preferably the internal multi-edge geometry, of the dynamic mixer serves for loss-free uptake of the torques from the drive shaft of the motor. This implies an increase in the efficiency of the transmission of torques from the drive shaft to the rotor shaft.

In an embodiment, the mixing apparatus has an optical sensor. It recognizes the position of the multi-edge geometry of the rotor shaft of the dynamic mixer. A microcontroller automatically adjusts the accurate position of the multi-edge geometry of the motor drive shaft of the mixing apparatus.

In an embodiment, the rotor shaft of the dynamic mixer has means for optical marking, in particular braille, a reflector and/or a 3D code.

A dynamic mixer is a mixer for mixing and discharging multi-component materials, in particular dental impression materials.

The first polygonal multi-edge geometry of the rotor shaft corresponds to the cross-section profile of the rotor shaft. The second polygonal multi-edge geometry of the drive shaft of the motor corresponds to the cross-section profile of the drive shaft of the motor. In an embodiment, the first and the second multi-edge geometry are coordinated in such a way that the first polygonal multi-edge geometry encompasses the second polygonal multi-edge geometry in a positive-locking manner. In doing so, the first polygonal multi-edge geometry is an outer multi-edge geometry and the second polygonal multi-edge geometry is a matching inner multi-edge geometry. In an embodiment, the reverse is true: the second polygonal multi-edge geometry encompasses the first multi-edge geometry in a positive locking manner, the second polygonal multi-edge geometry being an outer multi-edge geometry and the first polygonal multi-edge geometry being a matching inner multi-edge geometry. In doing so, outer multi-edge geometry and inner multi-edge geometry behave according to the key-lock principle In an embodiment, the method comprises:
automatic congruent alignment of the second defined rotational position of the drive shaft of the motor of the mixing apparatus at a first identified rotational position of the rotor shaft of the dynamic mixer, wherein an identification of the first identified rotational position of the rotor shaft of the dynamic mixer comprises a recognition of the means for optical marking being arranged at the first polygonal multi-edge geometry of the rotor shaft of the dynamic mixer by the optical sensor of the mixing apparatus, wherein a first information concerning the first identified rotational position of the rotor shaft of the dynamic mixer is generated by the optical sensor, the first information being transmitted to a control electronics of the drive shaft of the motor of the mixing apparatus, wherein the control electronics uses the first information to drive the drive shaft of the motor of the mixing apparatus in a rotational position being congruent to the first identified rotational position.

In an embodiment, the method, when manually transferring the first polygonal multi-edge geometry of the rotor shaft of the dynamic mixer from the first starting rotational position in the first defined rotational position, comprises the steps of:
sliding the third polygonal multi-edge geometry of the orientation template into or onto/around the first polygonal multi-edge geometry of the rotor shaft of the dynamic mixer, the first polygonal multi-edge geometry of the rotor shaft of the dynamic mixer initially being in an arbitrary rotational position;
turning the first polygonal multi-edge geometry of the rotor shaft of the dynamic mixer on its own axis by means of the third polygonal multi-edge geometry of the orientation template into a defined rotational position, until the at least one circular arc-shaped stop element encompasses in a positive-locking manner at least one inlet nozzle of the dynamic mixer;
removing the orientation template from the first polygonal multi-edge geometry of the rotor shaft of the dynamic mixer, the first polygonal multi-edge geometry of the rotor shaft of the dynamic mixer being in the defined rotational position, the defined rotational position remaining fixed; and optionally inserting the second polygonal multi-edge geometry of the drive shaft of the motor of the mixing apparatus into or onto the first polygonal multi-edge geometry of the rotor shaft of the dynamic mixer.

Wherein, when inserting the second polygonal multi-edge geometry of the drive shaft of the motor of the mixing apparatus into or onto the first polygonal multi-edge geometry of the rotor shaft of the dynamic mixer, the second polygonal multi-edge geometry of the drive shaft of the motor of the mixing apparatus being in a pre-defined rotational position, wherein, preferably, previously driving the drive shaft of the motor of the mixing apparatus into the pre-defined rotational position is carried out by a control function of the mixing apparatus, wherein the pre-defined rotational position of the drive shaft of the motor of the mixing apparatus has been fixed, the second polygonal multi-edge geometry of the drive shaft of the motor in the pre-defined rotational position being substantially congruent to the first polygonal multi-edge geometry of the rotor shaft of the dynamic mixer in the defined rotational position Now, the two hexagonal geometries are provided lying in a common alignment with each other in advantageous manner. In case of the mixing device, the defined pre-setting of the motor drive shaft is carried out via the device control. In case of the dynamic mixer, the pre-defined pre-setting of the rotor shaft is carried out by means of rotating the orientation template. The two defined pre-settings are mounted in relation to each other in such a way that a congruent angular position of the polygonal multiple-edge geometries results, so that the drive shaft may directly be driven into or onto the hexagonal geometry of the rotor. Thus, manually turning the drive shaft of the mixing device and/or the rotor shaft of the dynamic mixer to align the shafts with each other is thus not necessary. Readjustment of the two shafts is no longer necessary.

The orientation template is a template for aligning the rotor shaft of a dynamic mixer. The template has the form of a plate which has a hexagonal geometry and two hollow half cylinder segments. The hexagonal geometry of the rotor shaft is put into or onto the hexagonal geometry of the template for aligning the rotor shaft of the dynamic mixer. In this step, the two hollow cylinder segments are in an arbitrary position in relation to the respective inlet nozzle for catalyst and base. The, the user rotates the housing of the dynamic mixer until the hollow cylinder segments encompassing the inlet nozzles in a positive-locking manner. The center of the hexagonal geometry of the rotor shaft and the center of the inlet nozzles of the dynamic mixer then form a line and are thus aligned with each other.

The multi-edge geometry is either an outer multi-edge geometry or an inner multi-edge geometry, wherein one outer multi-edge geometry encompasses one inner multi-edge geometry at the interface between two shafts. Like this, the multi-edge geometry of the rotor shaft of the rotor of the dynamic mixer may be an outer multi-edge geometry, then the motor drive shaft has a matching inner multi-edge geometry, so that the motor drive shaft may be slid into the rotor shaft at least in part. If the rotor shaft of the rotor of the dynamic mixer has the inner multi-edge geometry, the motor drive shaft has the matching outer multi-edge geometry, so that the motor drive may be slid onto the rotor shaft at least in part.

A polygonal multi-edge geometry has the cross-section of a polygon, such as e.g. of a triangle, rectangle, pentagon, hexagon etc. In an embodiment, the term polygonal multi-edge geometry also comprises a polygonal course having curved edges.

The mixing apparatus according to the invention is electrically driven by a motor. Optionally, the mixing apparatus is digitally controlled also.

In an embodiment, the loosening torque of the rotor of the dynamic mixer is greater than or equal to 12 Ncm.

The loosening torque is the torque required for loosing the rotor of the dynamic mixer from its start position. The torques for loosening the rotors from the starting position are very low. The mixers of 3M Espe and Kettenbach are extremely smooth-running and loosing torques cannot be felt. The start-up value of the mixer of Sulzer Mixpac amounts to a maximum of 10 Ncm.

In an embodiment, the first polygonal multi-edge geometry is a first hexagonal geometry, the second polygonal multi-edge geometry is a second hexagonal geometry, and the third polygonal multi-edge geometry is a third hexagonal geometry.

In this way, the polygonal multi-edge geometries correspond in an advantageous manner to the common standard in the drive shaft of the motor of the mixing apparatus and in the rotor shaft of the rotor of the dynamic mixer. Common mixing apparatuses having hexagonal geometry interfaces between rotor shaft of the dynamic mixer and motor drive shaft of the motor of the mixing apparatus may be upgraded later on, insofar as a control function of the motor of the mixing apparatus is proved which drives the motor drive shaft into a pre-defined rotational position.

In an embodiment, the first hexagonal geometry may be an inner hexagonal geometry and the second hexagonal geometry may be an outer hexagonal geometry. In doing so, the outer hexagonal geometry encompasses the inner hexagonal geometry in a positive-locking manner. In a further embodiment, the second hexagonal geometry may be an inner hexagonal geometry and the first hexagonal geometry may be an outer hexagonal geometry. In doing so, the outer hexagonal geometry in turn encompasses the inner hexagonal geometry in a positive-locking manner.

In an embodiment, it is provided for second edges of the second polygonal multi-edge geometry of the drive shaft of the motor and first edges of the first polygonal multi-edge geometry of the rotor shaft of the dynamic mixer to be substantially arranged in a plane-parallel manner in the pre-defined rotational position of the second polygonal multi-edge geometry of the drive shaft of the motor and in the defined rotational position of the first polygonal multi-edge geometry of the rotor shaft of the dynamic mixer.

This means, in terms of the standard hexagonal geometry, that the edges of the hexagonal geometry of the rotor shaft of the rotor of the dynamic mixer are congruently aligned with the edges of the hexagonal geometry of the drive shaft of the motor of the mixing apparatus, so that the drive shaft of the motor may be slid into or onto the rotor shaft of the rotor of the dynamic mixer without turning.

In an embodiment, it is provided for first edges corresponding to the second edges and second edges corresponding to the first edges to span a rectangle due to the plane-parallelism respectively.

The edge length of the hexagon on the motor drive shaft of the mixing apparatus and the edge length of the hexagon of the rotor shaft of the dynamic mixer form the circumscribing lines of a common rectangle (A1 in FIG. 4b) in case of plane-parallelism, i.e. in case of the rotational position of motor drive shaft of the mixing apparatus and toro shaft of the dynamic mixer match exactly. This is the ideal case of the adjustment to be achieved.

In an embodiment, a tolerance deviation of the plane-parallelism is permissible, the tolerance deviation being measured in an angle deviation of the spanned rectangle from its position in plane-parallelism, and being 7.5 degree at most.

First edges of the polygonal multi-edge geometry of the rotor shaft of the rotor of the dynamic mixer circumscribe a first rectangle A1. Second edges of the polygonal multi-edge geometry of the motor drive shaft of the motor of the mixing apparatus circumscribe a second rectangle B1. These rectangles having area A1 and area B1 must not be tilted against each other exceeding 7.5° (β) (see FIG. 4c), so that an accuracy of fit of rotor shaft and motor drive shaft is still met sufficiently. I.e. second edges of the second polygonal multi-edge geometry of the drive shaft of the motor corresponding to first edges and first edges of the polygonal multi-edge geometry of the rotor shaft of the dynamic mixer corresponding to second edges must not differ from each other exceeding 7.5 degree, so that sliding the motor shaft into or onto the rotor shaft is still possible without further turning.

In an embodiment, it is provided for the mixing apparatus to comprise a cartridge having at least two cartridge bodies to receive at least two 2K compositions, in particular two 2K dental materials, the drive shaft of the motor of the mixing apparatus being arranged between the at least two cartridge bodies.

The drive shaft of the motor runs between the at least two cartridge body of the cartridge in a space-saving manner. In a further embodiment, the drive shaft of the motor of the mixing apparatus runs behind or in front of or next to the cartridge bodies. In the end, it does not matter where the motor drive shaft runs relative to the cartridge bodies. It only depends on the interface between the rotor shaft of the dynamic mixer and the motor drive shaft of the mixing apparatus. The alignment method according to the invention is thus applicable to different types of mixing apparatuses.

Dental materials comprise dental impression materials, preferably polydimethyl silicone-based impression materials. Preferably, said impression materials are multi-component, in particular two-component.

In an embodiment, the method comprises the step of:
providing an orientation template, the orientation template having a third polygonal multi-edge geometry and at least one circular arc-shaped stop element.

In this way, a means for alignment of the rotor shaft of the rotor of the dynamic mixer and/or for alignment of the drive shaft of the motor of the mixing apparatus is proved to the user in advantageous manner. In doing so, the orientation template has a third polygonal multi-edge geometry which is suited as inner or outer multi-edge geometry and coordinates the multi-edge geometry of the rotor shaft and the multi-edge geometry of the motor shaft with each other to make them slidable into each other or onto each other.

The invention further relates to an orientation template for congruent and coaxial alignment of a first polygonal multi-edge geometry of a rotor shaft of a dynamic mixer with a second polygonal multi-edge geometry of a drive shaft of a motor of a mixing apparatus, the orientation template having a third polygonal multi-edge geometry and at least one circular arc-shaped stop element, the third polygonal multi-edge geometry being adapted to rotate the rotor shaft of the dynamic mixer, the at least one circular arc-shaped stop element being adapted to encompass in a positive-locking manner an inlet nozzle of the dynamic mixer in a defined rotational position of the orientation template in relation to the rotor shaft of the dynamic mixer.

The orientation template serves for alignment of the rotor shaft of the rotor of the dynamic mixer. The orientation template is set with its hexagonal geometry into or about the hexagonal geometry of the rotor shaft and rotated until stop of the inlet nozzles to the two half-cylindrical stop elements. If the two inlet nozzles of the dynamic mixer form a reference line, an edge of the hexagonal geometry of the rotor shaft may form a particular angle α (see FIG. 3). The rotor shaft is now situated in a pre-defined desired rotational position.

In an embodiment, the first polygonal multi-edge geometry is a first hexagonal geometry, the second polygonal multi-edge geometry is a second hexagonal geometry, and the third polygonal multi-edge geometry is a third hexagonal geometry.

In this way, a standardisation of the interface between rotor shaft of the dynamic mixer and motor drive shaft of the mixing apparatus is realised in advantageous manner. The method may be applied to common mixing apparatus having a hexagonal geometry interface between rotor shaft and motor drive shaft.

The invention further relates to a mixing apparatus, in particular a dental mixing apparatus, comprising
a motor having a drive shaft;
a first receiving fixture to receive a cartridge having at least two cartridge bodies to receive at least two dental materials; and
a second receiving fixture to receive a dynamic mixer, in particular a dental dynamic mixer, having rotor and rotor shaft, the drive shaft being adapted to drive the rotor shaft;
the rotor shaft of the dynamic mixer comprising a first polygonal multi-edge geometry, the drive shaft of the mixing apparatus comprising a second polygonal multi-edge geometry, the second polygonal multi-edge geometry at pre-defined rotational position being congruently insertable into or onto the first polygonal multi-edge geometry at defined rotational position,
the second polygonal multi-edge geometry of the drive shaft of the motor being transferable into the pre-defined rotational position by a control function of the motor, and/or the first polygonal multi-edge geometry of the rotor shaft of the dynamic mixer being transferable into the defined rotational position by means of a third polygonal multi-edge geometry of an orientation template.

The mixing apparatus according to the invention has the advantage of rendering trial-and-error attempts at adjustment obsolete when bringing together the rotor shaft of the dynamic mixer and the motor drive shaft of the mixing apparatus. Direct sliding of the motor drive shaft into or onto the rotor shaft without any rotation is possible by bringing the rotor shaft and motor drive shaft into the respective predefined rotational position so that the polygonal multi-edge geometries are accurately opposite each other In an embodiment, the position of the multi-edge geometry of the drive shaft of the mixing apparatus may correspond to a defined position that exactly corresponds to the position of the rotor shaft of the dynamic mixer. In a further embodiment, the drive shaft of the mixing apparatus preferably has an optical sensor. It recognizes the optical marking on the rotor shaft of the dynamic mixer and thus the respective position of the multi-edge geometry of the rotor shaft of the dynamic mixer, so that a microcontroller receiving this information may adjust the accurate position of the multi-edge geometry of the rotor shaft of the dynamic mixer.

In an embodiment, the first polygonal multi-edge geometry is a first hexagonal geometry, the second polygonal multi-edge geometry is a second hexagonal geometry, and the third polygonal multi-edge geometry is a third hexagonal geometry.

In this way, the mixing apparatus has a standardised interface between rotor shaft and motor drive shaft. The method may be applied to common mixing apparatuses using the hexagonal geometry as standard interface between motor drive shaft of the mixing apparatus and rotor shaft of the dynamic mixer.

In doing so, in an embodiment, the first hexagonal geometry may be an inner hexagonal geometry and the second hexagonal geometry may be an outer hexagonal geometry. In a further embodiment, the first hexagonal geometry is an outer hexagonal geometry and the second hexagonal geometry is an inner hexagonal geometry. The third hexagonal geometry is an inner or outer hexagonal geometry. The outer hexagonal geometry encompasses in a positive-locking manner the inner hexagonal geometry.

In an embodiment, it is provided for second edges of the second polygonal multi-edge geometry of the drive shaft of the motor and first edges of the first polygonal multi-edge geometry of the rotor shaft of the dynamic mixer to be substantially arranged in a plane-parallel manner in the pre-defined rotational position of the second polygonal multi-edge geometry of the drive shaft of the motor and in the defined rotational position of the first polygonal multi-edge geometry of the rotor shaft of the dynamic mixer.

The interfaces of rotor shaft and motor drive shaft are aligned with each other in such a way that there is plane-parallelism between corresponding edges of the respective hexagonal geometry. The rotational positions of rotor shaft and motor drive shaft are therefore precisely matched to each other and can be pushed into each other without further turning. Further adjustment is therefore not necessary.

In an embodiment, it is provided for first edges corresponding to the second edges and second edges corresponding to the first edges to span a rectangle due to the plane-parallelism respectively.

This is shown in FIG. 4b. The first polygonal multi-edge geometry of the rotor shaft of the dynamic mixer is congruent to the second polygonal multi-edge geometry of the drive shaft of the motor of the mixing apparatus. Thus, first edges of the first polygonal multi-edge geometry of the rotor shaft are in plane-parallel to second edges of the second polygonal multi-edge geometry of the drive shaft of the motor of the mixing apparatus. The first edges with the plane-parallel second edges span a rectangle respectively.

In an embodiment, it is provided for a tolerance deviation of the plane-parallelism to be permissible, the tolerance deviation being measured in an angle deviation of the spanned rectangle from its position in plane-parallelism, and being 7.5 degree at most.

This is shown in FIG. 4c. In case of slight turning of the first polygonal multi-edge geometry of the rotor shaft of the dynamic mixer against the second polygonal multi-edge geometry of the drive shaft of the motor of the mixing apparatus, the first edges of the first polygonal multi-edge geometry of the rotor shaft of the dynamic mixer and the second edges of the second polygonal multi-edge geometry of the drive shaft of the motor of the mixing apparatus are no longer aligned in plan-parallel with each other. The first edges circumscribe a first rectangle A1. The second edges circumscribe a second rectangle B1. The first rectangle A1 and the second rectangle B1 are not located in the same plane, but form an angle with each other. The angle between these two rectangular areas A1 and B1 must not exceed 7.5 degrees, so that an accuracy of fit for sliding the first polygonal multi-edge geometry of the rotor shaft of the dynamic mixer into or onto the second polygonal multi-edge geometry of the drive shaft of the motor of the mixing apparatus is still met sufficiently.

The invention further relates to a mixing apparatus with an optical sensor, the optical sensor being arranged in the mixing apparatus, the optical sensor being adapted to identify optical markings on a rotor shaft of a rotor of a dynamic mixer, wherein different positions of the optical markings correspond to different rotational positions of a multi-edge geometry of the rotor shaft of the rotor of the dynamic mixer.

The invention relates to a dynamic mixer, in particular for dental materials having different viscosity, wherein the dynamic mixer comprises:

a chamber part being largely cylindrical at least in part, having a discharge opening at the front end of the chamber part, the chamber part comprising a mixing chamber, and a closing part arranged at the back end of the chamber part, having a first and second inlet opening for single components to be inserted, as well as a centrical opening for a rotor shaft of a rotor being rotatable about its longitudinal axis in the chamber part, the chamber part and the closing part being mounted against each other in a rotationally symmetric manner to the rotor shaft, the closing part having at least two substantially parallel planes at the side averting the rotor tip that are axially put in a row, the plane averting the rotor comprising the first and the second inlet opening, the plane facing the rotor having a first and a second passage opening to the mixing chamber, the first inlet opening and the first passage opening forming a linear duct, the at least two substantially parallel planes axially put in a row forming a feeding duct between the second inlet opening and the second passage opening to the mixing chamber, the feeding duct extending on an inner partial circle of the closing part, the rotor shaft having a first polygonal multi-edge geometry as cross section profile, i) the polygonal multi-edge geometry of the rotor shaft being aligned in the first rotational position and, in particular, fixed in the first rotational position, preferably detachably anchored, or ii) the polygonal multi-edge geometry of the rotor shaft in the first rotational position being initially aligned by means of an orientation template or detachably fixed and initially aligned by means of a tag, and/or iii) the first polygonal multi-edge geometry having means for optical marking of a rotational position of the polygonal multi-edge geometry, in particular the means for optical marking comprising braille, a reflector and/or a 3D code, the means for optical marking being suited to be recognized by an optical sensor.

The feeding duct is a duct running in an interspace between two planes substantially arranged in parallel.

The two substantially parallel planes axially put in a row are two plane layers in the closing part arranged adjacently.

2K composition, in particular 2K dental materials preferably comprise two components (2K) that are preferably selected from dental impression materials, particularly preferably 2K polydimethyl siloxane (PDMS)-containing impression materials.

The invention further relates to a kit comprising a dynamic mixer and an orientation template.

The invention further relates to the use of an orientation template for congruent and coaxial alignment of a first polygonal multi-edge geometry of a rotor shaft of a dynamic mixer with a second polygonal multi-edge geometry of a drive shaft of a motor of a mixing apparatus, the orientation template having a third polygonal multi-edge geometry and at least one circular arc-shaped stop element, the third polygonal multi-edge geometry being adapted to rotate the rotor shaft of the dynamic mixer, the at least one circular arc-shaped stop element being adapted to encompass in a positive-locking manner an inlet nozzle of the dynamic mixer in a defined rotational position of the orientation template in relation to the rotor shaft of the dynamic mixer.

Further details, features and advantages of the invention are shown in the drawings, as well as in the following description of preferred embodiments based on the drawings. The drawings merely illustrate exemplary embodiments of the invention, which do not restrict the essential idea of the invention.

EMBODIMENTS OF THE INVENTION

Figure 1:
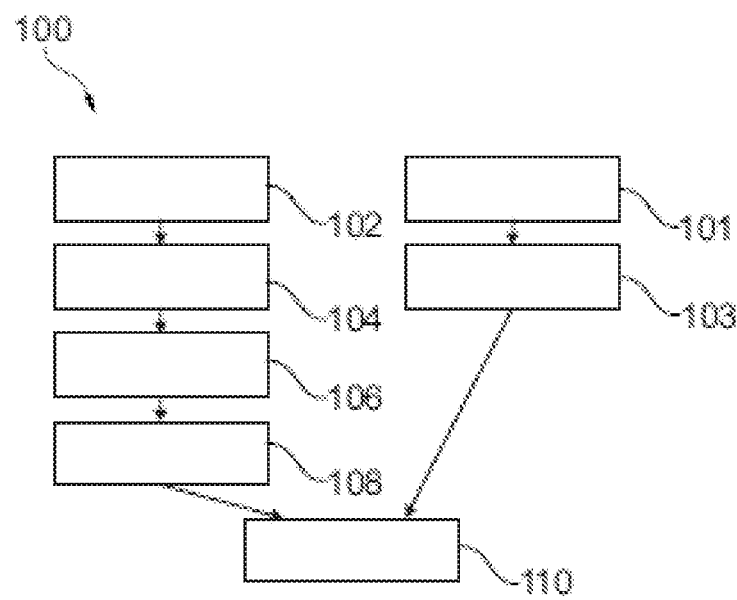
FIG. 1 shows a flow chart with the method steps of the method 100 according to the invention.

FIG. 1 shows a flow chart with the method steps of the method 100 according to the invention for congruent alignment of a first polygonal multi-edge geometry 2 of a rotor shaft 3 of a dynamic mixer 4 with a second polygonal multi-edge geometry 5 of a drive shaft of a motor 7 of a mixing apparatus 8. The method comprises the following method steps: in method step 102, an orientation template 1 is provided. The orientation template 1 has a third polygonal multi-edge geometry 9 and at least one circular arc-shaped stop element 10. In method step 104, the third polygonal multi-edge geometry 9 of the orientation template 1 is slid into or onto the first polygonal multi-edge geometry 2 of the rotor shaft 3 of the dynamic mixer 4. The first polygonal multi-edge geometry 2 of the rotor shaft 3 of the dynamic mixer 4 is thereby initially in an arbitrary rotational position. In method step 106, the first polygonal multi-edge geometry 2 of the rotor shaft 3 of the dynamic mixer 4 is turned on its own axis by means of the third polygonal multi-edge geometry 9 of the orientation template 1 in a defined rotational position, until the at least one circular arch-shaped stop element 10 encompasses in a positive-locking manner at least one inlet nozzle 11 of the dynamic mixer 4. In method step 108, the orientation template 1 is removed from the first polygonal multi-edge geometry 2 of the rotor shaft 3 of the dynamic mixer 4, the first polygonal multi-edge geometry 2 of the rotor shaft 3 of the dynamic mixer 4 being in a defined rotation position, the defined rotational position remaining fixed.

In method step 101, the drive shaft 6 of the motor 7 of the mixing apparatus 8 is driven into a pre-defined rotational position by a control function of the mixing apparatus 8. In method step 103, the pre-defined rotational position of the drive shaft 6 of the motor 7 of the mixing apparatus 8 is fixed.

In method step 110, the second polygonal multi-edge geometry 5 of the drive shaft 6 of the motor 7 of the mixing apparatus 8 is slid into or onto the first polygonal multi-edge geometry 2 of the rotor shaft 3 of the dynamic mixer 4, the second polygonal multi-edge geometry 5 of the drive shaft 6 of the motor 7 of the mixing apparatus 8 being in a defined rotational position.

Figure 2:
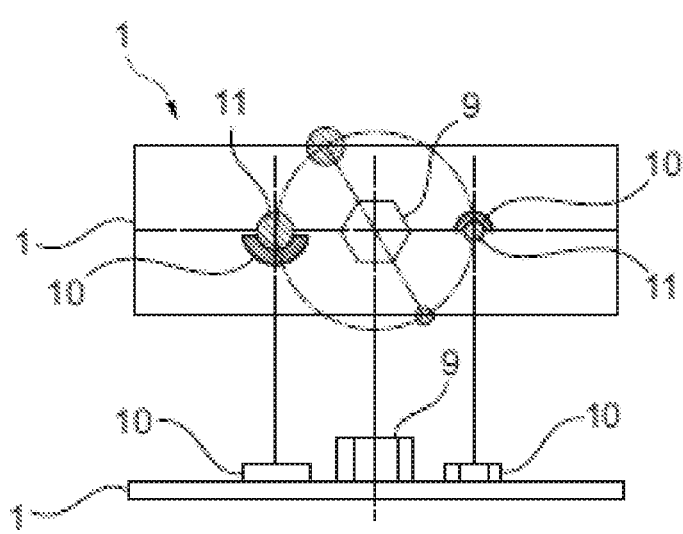
FIG. 2 shows the orientation template 1 according to the invention in side view and in a top view from above.

FIG. 2 shows an orientation template 1 according to the invention in side view and in a top view from above. In one embodiment, the orientation template 1 is a plate having a third polygonal multi-edge geometry 9 and two circular arc-shaped stop elements 10. The third polygonal multi-edge geometry 9 of the orientation template 1 "fits" in or around the first polygonal multi-edge geometry 2 of a rotor shaft 3 of a dynamic mixer 4, so that the first polygonal multi-edge geometry 2 of the rotor shaft 3 may be brought into a particular defined rotational position by means of the third polygonal multi-edge geometry of the orientation template 1. In order to achieve a reproducible rotational position of the rotor shaft 3, two circular arc-shaped stop elements 10 are mounted on the orientation template 1, at which the two inlet nozzles 11 of the dynamic mixer 4 "stop" when rotating the rotor shaft 3 in a particular rotational position. This rotational position is the pre-defined rotational position of the rotor shaft 3 of the dynamic mixer 4.

In an embodiment, the third polygonal multi-edge geometry 9 of the orientation template 1 is a multi-edge outer geometry and the first polygonal multi-edge geometry 2 of the rotor shaft 3 is a multi-edge inner geometry. In a further embodiment, the third polygonal multi-edge geometry 9 of the orientation template 1 is a multi-edge inner geometry and the first polygonal multi-edge geometry 2 of the rotor shaft 3 is a multi-edge outer geometry.

In an embodiment, the third polygonal multi-edge geometry 9 of the orientation template 1 is a hexagonal outer geometry and the first polygonal multi-edge geometry of the rotor shaft 3 is a hexagonal inner geometry. In a further embodiment, the third polygonal multi-edge geometry 9 of the orientation template 1 is a hexagonal multi-edge geometry and the first polygonal multi-edge geometry 2 of the rotor shaft 3 is a hexagonal outer geometry.

Figure 3:
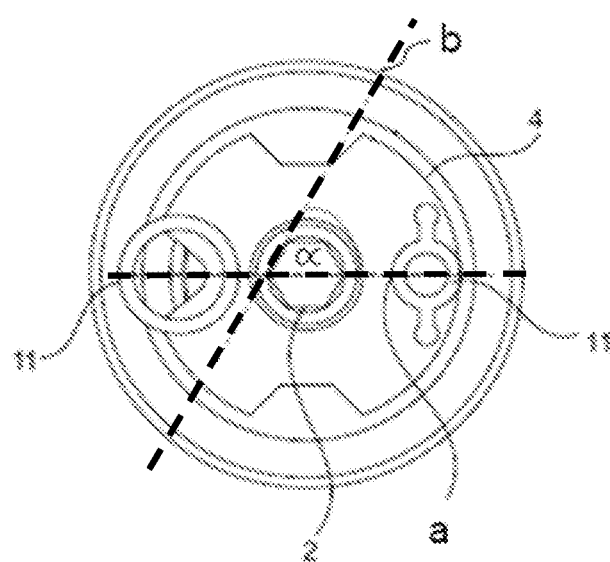
FIG. 3 shows the dynamic mixer 4 with a top view on the two inlet nozzles 11 and the rotor shaft 3.

FIG. 3 shows a dynamic mixer 4 with a top view on the two inlet nozzles 11 and the rotor shaft 3. The two inlet nozzles 11 form a reference line a which runs through the center of the rotor shaft 3. If a straight line b that runs parallel to one of the edges of the polygonal multi-edge geometry and does not run parallel to the reference line a is taken, the straight line and the reference line form an angle α. In this way, a particular rotational position of the rotor shaft 3 may be pre-defined by means of designating a specific angle.

Figure 4:
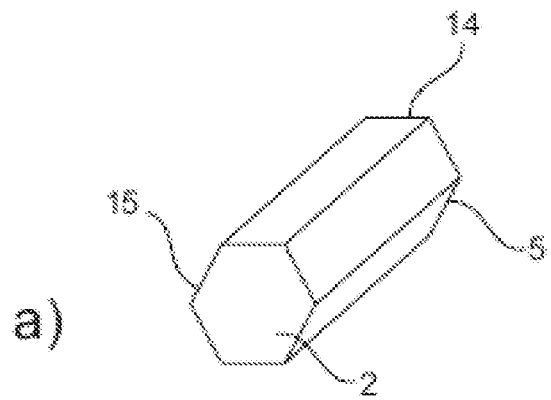
FIG. 4 shows the interface between motor drive shaft 6 of the mixing apparatus 8 and rotor shaft 3 of the dynamic mixer 4 simplified as hexagonal geometry.
Figure 4:
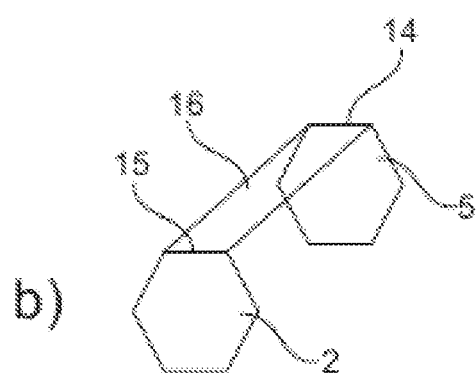
Figure 4:
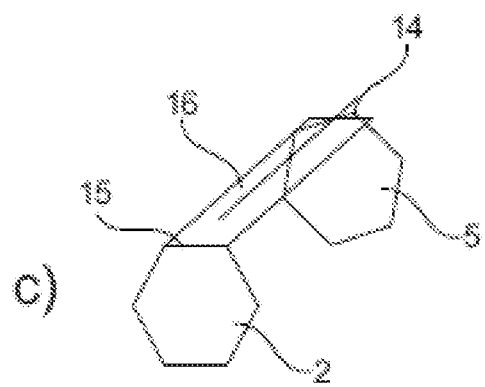

FIG. 4 shows an interface between motor drive shaft 6 of the mixing apparatus 8 and rotor shaft 3 of the dynamic mixer 4 simplified as hexagonal geometry. The anterior hexagonal geometry is to be associated to the rotor shaft 3 of the dynamic mixer 4 respectively. The posterior hexagonal geometry is to be associated to the motor drive shaft 6 of the mixing apparatus 8. Corresponding edges 14, 15 of the two hexagonal geometries respectively form a common rectangular area A1 in case of plane-parallelism of the edges (FIG. 4b).

In case of slight turning of motor drive shaft 6 and rotor shaft 3 against each other, the corresponding edges 14, 15 do no longer form a common rectangular area A1, but two rectangular areas A1 and B1 tilted to each other. The tilt between these two rectangular areas A1 and B1 must not exceed 7.5 degrees, so that an accuracy of fit of hexagonal geometry of the motor drive shaft 6 of the mixing apparatus 8 and the hexagonal geometry of the rotor shaft 3 of the dynamic mixer 4 is still met sufficiently.

Figure 5:
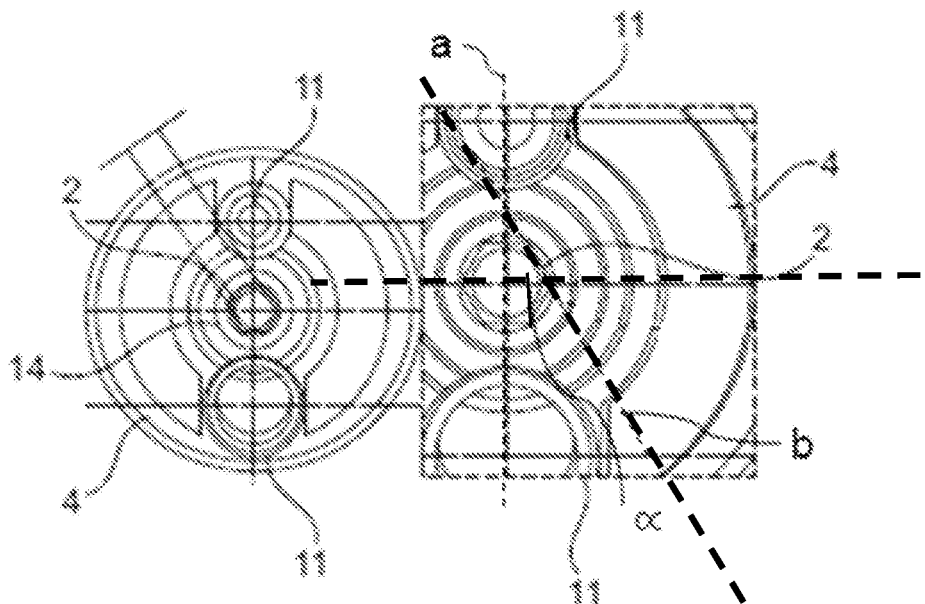
FIG. 5 shows the dynamic mixer 4 at the interface between rotor shaft 3 of the dynamic mixer 4 and drive shaft 6 of the mixing apparatus 8.

FIG. 5 shows a dynamic mixer 4 at the interface between rotor shaft 3 of the dynamic mixer 4 and drive shaft 6 of the mixing apparatus 8. The hexagonal geometry of the motor drive shaft 6 of the mixing apparatus 8 or of the rotor shaft 3 of the dynamic mixer 4, respectively, is centrally located. The two inlet nozzles 11 of the dynamic mixer 4 are located on the side. The centres of the two inlet nozzles 11 and the centre of the hexagonal geometry of the motor drive shaft 6 of the mixing apparatus 8 or of the rotor shaft 3 of the dynamic mixer 4, respectively, are on a line with each other. One edge of the hexagonal geometry of the motor drive shaft 6 of the mixing apparatus 8 or the rotor shaft 3 of the dynamic mixer 4, respectively, forms an angle α with this line. This angle may serve for determining a particular pre-defined rotational position of the hexagonal geometry of the motor drive shaft 6 of the mixing apparatus 8 or of the rotor shaft 3 of the dynamic mixer 4, respectively.

Figure 6:
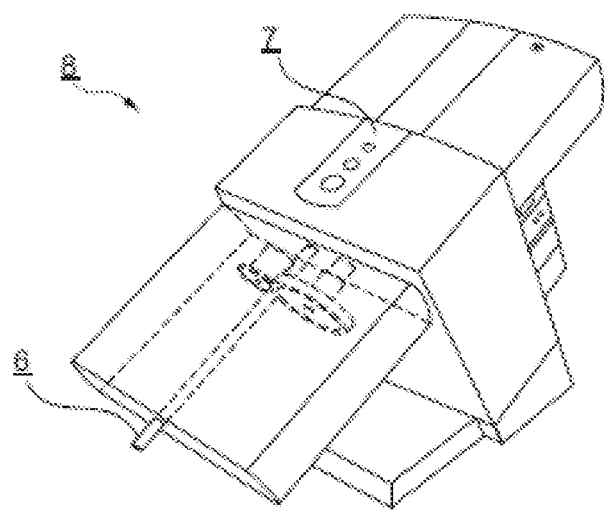
FIG. 6 shows a mixing apparatus 8.

FIG. 6 shows a mixing apparatus 8. A motor 7 is arranged at the top of the housing. A motor drive shaft 6 can be seen protruding from the bottom of the housing.

Figure 7:
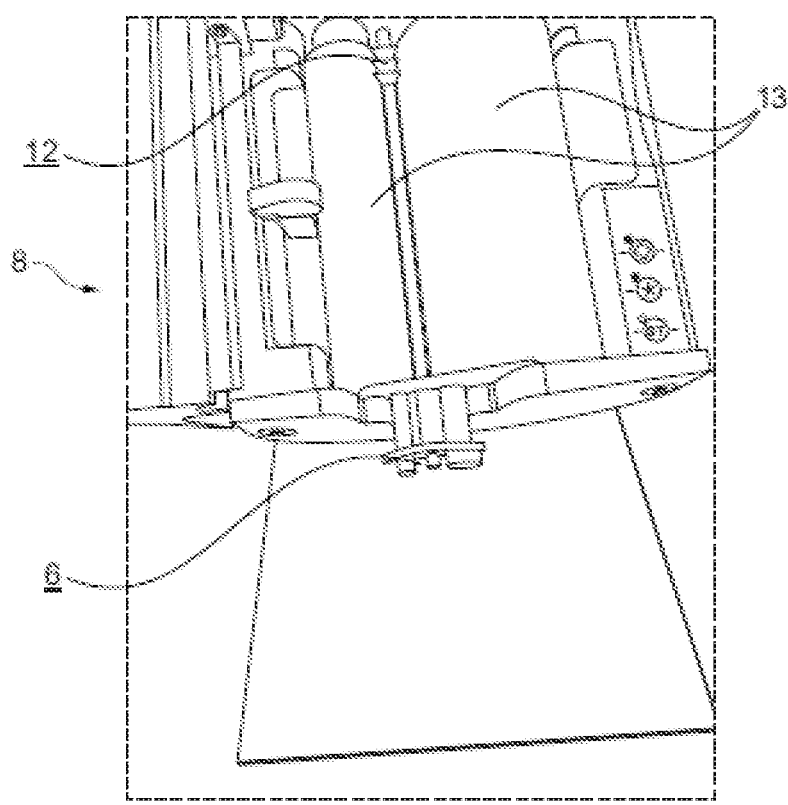
FIG. 7 shows a detail of the mixing apparatus 8.

FIG. 7 shows a detail from the mixing apparatus 8. The operation site of the double cartridge 12 is shown with inserted double cartridge 12. The motor drive shaft 6 runs between the cartridge bodies 13.

Figure 8:
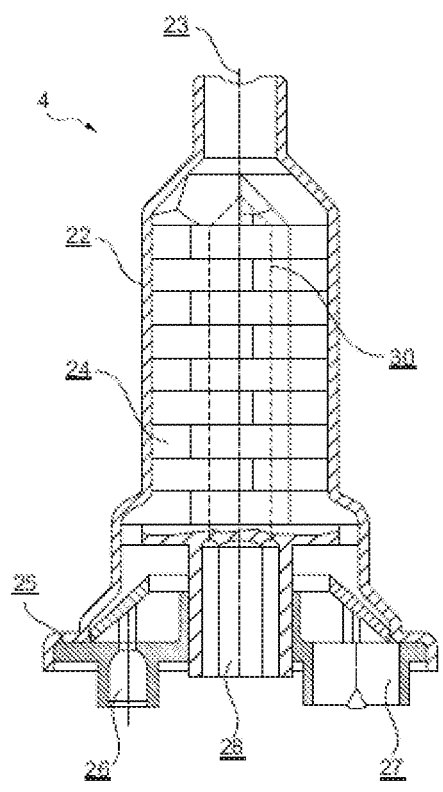
FIG. 8 shows a dynamic mixer 4 in cross-section profile.

FIG. 8 shows a dynamic mixer 4 in cross-section profile. The dynamic mixer 4 comprises a chamber part 22 and a closing part 25. The rotor 30 is centrally arranged in the mixing chamber 24 of the chamber part 22. The chamber part 22 has a discharge opening 23 at its end, through which dental materials are discharged out of the mixing chamber 24 after mixing. Dental materials are inserted into the dynamic mixer 4 through a first inlet opening 26 or through a second inlet opening 27, respectively. A centrical opening 28 is centrally situated at the closing part 25.

REFERENCE NUMERALS a reference line
b straight line running parallel to one of the edges of the polygonal multi-edge geometry
1 orientation template
2 first polygonal multi-edge geometry
3 rotor shaft
4 dynamic mixer, in particular dental dynamic mixer
5 second polygonal multi-edge geometry
6 (motor) drive shaft
7 motor
8 mixing apparatus, in particular dental mixing apparatus
9 third polygonal multi-edge geometry
10 circular arc-shaped stop element
11 inlet nozzle
12 double cartridge
13 cartridge body
14 second edges
15 first edges
16 rectangle
22 chamber part (=housing of the mixer lid)
23 discharge opening
24 mixing chamber
25 closing part (=housing of the mixer bottom)
26 first inlet opening
27 second inlet opening
28 centrical opening
30 rotor
31 plane averting the rotor
32 plane facing the rotor
33 first passage opening
34 second passage opening
35 feeding duct
angle α (FIG. 5)

The invention claimed is:

1. Method (100) for congruent alignment of a first polygonal multi-edge geometry (2) of a rotor shaft (3) of a dynamic mixer (4) with a second polygonal multi-edge geometry (5) of a drive shaft (6) of a motor (7) of a mixing apparatus (8), and optionally insertion of the second polygonal multi-edge geometry (5) of the drive shaft (6) of the motor (7) of the mixing apparatus (8) into or onto the first polygonal multi-edge geometry (2) of the rotor shaft (3) of the dynamic mixer (4), the method comprising a step selected from:
 a) providing a dynamic mixer (4) the first polygonal multi-edge geometry (2) of the rotor shaft (3) being in a first defined rotational position, and
  positioning the dynamic mixer (4) in the mixing apparatus (8), the second polygonal multi-edge geometry (5) of the drive shaft (6) of the motor (7) of the mixing apparatus (8) being in the second defined rotational position, or being transferred from a second starting rotation position into a second defined rotational position, or
 b) transferring the first polygonal multi-edge geometry (2) of the rotor shaft (3) of the dynamic mixer (4) being positioned in the mixing apparatus (8) from a first starting rotational position in a first defined rotational position, and/or
 c) transferring the second polygonal multi-edge geometry (5) of the drive shaft of the motor (7) of the mixing apparatus (8) from a second starting rotational position in a second defined rotational position;
 wherein, after a) positioning the dynamic mixer (4) in the mixing apparatus (8), the first defined rotational position is congruently aligned with the second rotational position, or wherein, after positioning the dynamic mixer (4) in the mixing apparatus (8) and performing one step of the two steps b) or c) or both steps b) and c), the first defined rotational position is congruently aligned with the second rotational position, wherein b) transferring the first polygonal multi-edge geometry (2) of the rotor shaft (3) of the dynamic mixer (4) from the first starting rotational position into the first defined rotational position is carried out i) manually or (ii) automatically, wherein i) an orientation template having a third polygonal multi-edge geometry is used when manually transferring the first polygonal multi-edge geometry (2) of the rotor shaft (3) of the dynamic mixer (4), and
 ii) optical markings comprising braille, a reflector and/or a 3D code are arranged at the first polygonal multi-edge geometry (2) of the rotor shaft (3) of the dynamic mixer (4) are recognized by an optical sensor of the mixing apparatus (8) to identify a respective rotational position of the first polygonal multi-edge geometry (2) of the rotor shaft (3) of the dynamic mixer (4) when automatically transferring the first polygonal multi-edge geometry (2) of the rotor shaft (3) of the dynamic mixer (4) from the first starting rotational position in the first defined rotational position,
 wherein congruent alignment of the first defined rotational position of the rotor shaft (3) of the dynamic mixer (4) with the second defined rotational position of the drive shaft (6) of the motor (7) of the mixing apparatus (8) of step b) comprises:
 sliding the second polygonal multi-edge geometry (5) of the drive shaft (6) of the motor of the mixing apparatus (8) into or onto the first polygonal multi-edge geometry of the rotor shaft (3) of the dynamic mixer (110), the second polygonal multi-edge geometry of the drive shaft of the motor of the mixing apparatus (8) being in a defined rotational position, wherein driving the drive shaft of the motor (7) of the mixing apparatus (8) into the pre-defined rotational position (101) is carried out by a control function of the mixing apparatus (8), wherein the pre-defined rotational position of the drive shaft (6) of the motor (7) of the mixing apparatus (8) has been fixed (103), the second polygonal multi-edge geometry (5) of the drive shaft (6) of the motor (7) in the pre-defined rotational position being substantially congruent to the first polygonal multi-edge geometry (2) of the rotor shaft (3) of the dynamic mixer (4) in the defined rotational position, or wherein d) the first polygonal multi-edge geometry (2) of the rotor shaft (3) of the dynamic mixer (4) is in a first starting rotational position, wherein means for optical marking are arranged at the first polygonal multi-edge geometry (2) of the rotor shaft (3) or at the rotor shaft (3) of the dynamic mixer (4), which being recognized by an optical sensor of the mixing apparatus (8), to identify a respective rotational position of the first polygonal multi-edge geometry (2) of the rotor shaft (3) of the dynamic mixer (4), and transferring the second polygonal multi-edge geometry (5) of the drive shaft of the motor (7) of the mixing apparatus (8) from a second starting rotational position in the aforementioned respective rotational position of the first polygonal multi-edge geometry (2) of the rotor shaft (3) of the dynamic mixer (4), so that the second polygonal multi-edge geometry (5) of the drive shaft of the motor (7) of the mixing apparatus (8) and the first polygonal multi-edge geometry (2) of the rotor shaft (3) being congruently aligned in the respective rotational position of the multi-edge geometry (2).

2. Method according to claim 1, wherein according to step b) ii) in which automatically transferring of the first polygonal multi-edge geometry (2) of the rotor shaft (3) of the dynamic mixer (4) from the first starting rotational position in the first defined rotational position into the congruent alignment of the first defined rotational position of the rotor shaft (3) of the dynamic mixer (4) with the second defined rotational position of the drive shaft (6) of the motor (7) of the mixing apparatus (8) occurs, the method further comprising:

automatic congruent alignment of the second defined rotational position of the drive shaft (6) of the motor (7) of the mixing apparatus (8) at a first identified rotational position of the rotor shaft (3) of the dynamic mixer (4), wherein an identification of the first identified rotational position of the rotor shaft (3) of the dynamic mixer (4) comprises a recognition of the means for optical marking being arranged at the first polygonal multi-edge geometry (2) of the rotor shaft (3) of the dynamic mixer (4) by the optical sensor of the mixing apparatus (8), wherein a first information concerning the first identified rotational position of the rotor shaft (3) of the dynamic mixer (4) is generated by the optical sensor, the first information being transmitted to a control electronics of the drive shaft (6) of the motor (7) of the mixing apparatus (8), wherein the control electronics uses the first information to drive the drive shaft (6) of the motor (7) of the mixing apparatus (8) in a rotational position being congruent to the first identified rotational position.

3. Method (100) according to claim 1, wherein according to step b) i), when manually transferring the first polygonal multi-edge geometry (2) of the rotor shaft (3) of the dynamic mixer (4) from the first starting rotational position in the first defined rotational position, the method further comprises the steps of:

sliding the third polygonal multi-edge geometry (9) of the orientation template (1) into or onto/around the first polygonal multi-edge geometry (2) of the rotor shaft (3) of the dynamic mixer (4) (104), the first polygonal multi-edge geometry (2) of the rotor shaft (3) of the dynamic mixer (4) initially being in an arbitrary rotational position;

turning the first polygonal multi-edge geometry (2) of the rotor shaft (3) of the dynamic mixer (4) on its own axis by means of the third polygonal multi-edge geometry (9) of the orientation template (1) into a defined rotational position (106), until the at least one circular arc-shaped stop element (10) encompasses in a positive-locking manner at least one inlet nozzle (11) of the dynamic mixer (4);

removing the orientation template (1) from the first polygonal multi-edge geometry (2) of the rotor shaft (3) of the dynamic mixer (4) (108), the first polygonal multi-edge geometry (2) of the rotor shaft (3) of the dynamic mixer (4) being in the defined rotational position, the defined rotational position remaining fixed; and optionally inserting the second polygonal multi-edge geometry (5) of the drive shaft (6) of the motor (7) of the mixing apparatus (8) into or onto the first polygonal multi-edge geometry (2) of the rotor shaft (3) of the dynamic mixer (4).

4. Method (100) according to claim 1, wherein the first polygonal multi-edge geometry (2) is a first hexagonal geometry, the second polygonal multi-edge geometry (5) is a second hexagonal geometry, and the third polygonal multi-edge geometry (9) is a third hexagonal geometry.

5. Method according to claim 1, wherein second edges (14) of the second polygonal multi-edge geometry of the drive shaft of the motor (7) and first edges (15) of the first polygonal multi-edge geometry (2) of the rotor shaft (3) of the dynamic mixer (4) are substantially arranged in a plane-parallel manner in the pre-defined rotational position of the second polygonal multi-edge geometry (5) of the drive shaft (6) of the motor (7) and in the defined rotational position of the first polygonal multi-edge geometry (2) of the rotor shaft (3) of the dynamic mixer (4).

6. Method according to claim 5, wherein first edges (15) corresponding to the second edges (14) and second edges (14) corresponding to the first edges (15) span a rectangle (16) due to the plane-parallelism respectively.

7. Method according to claim 6, wherein a tolerance deviation of the plane-parallelism is permissible, the tolerance deviation being measured in an angle deviation of the spanned rectangle (16) from its position in plane-parallelism, and being 7.5 degree at most.

8. Method according to any claim 1, wherein the mixing apparatus (8) comprises a cartridge (12) having at least two cartridge bodies (13) to receive at least two 2K compositions the drive shaft (6) of the motor (7) of the mixing apparatus (8) being arranged between the at least two cartridge bodies (13).

9. Method according to claim 8, wherein the at least two 2K compositions are two 2K dental materials.

10. Method according to claim 1, wherein if step b) is chosen from steps b) and c), the method further comprises prior to step b) the step of:

providing an orientation template (1), the orientation template (1) having a third polygonal multi-edge geometry (9) and at least one circular arc-shaped stop element (10).

11. Method according to claim 1, wherein the loosening torque of the rotor (30) of the dynamic mixer (4) is greater than or equal to 12 Ncm.

12. Method according to claim 1, wherein the rotor shaft (3) of the dynamic mixer (4) and the drive shaft (6) of the motor (7) are free from additional guiding structures and/or guiding sections, the first polygonal multi-edge geometry 82) of the rotor shaft (3) and the second polygonal multi-edge geometry (5) of the drive shaft (6) being absolutely sufficient for their common congruent and/or coaxial alignment prior to commissioning of the dynamic mixer (4), and optionally for their congruent and/or coaxial guiding during the mixing process of the dynamic mixer (4).

13. Method according to claim 1, wherein the dynamic mixer (4) is a dental dynamic mixer.

\* \* \* \* \*